A. F. RISSER & M. G. LANG.
Harness-Saddle.

No. 206,405. Patented July 30, 1878.

Witnesses
W. C. Corliss
Jno. C. MacGregor

Inventors
Abraham F. Risser & Michael G. Lang
By _____ Attorneys

UNITED STATES PATENT OFFICE.

ABRAHAM F. RISSER AND MICHAEL G. LANG, OF JOLIET, ASSIGNORS TO SAID RISSER AND BALTZER K. REITZ, OF CHICAGO, ILLINOIS.

IMPROVEMENT IN HARNESS-SADDLES.

Specification forming part of Letters Patent No. 206,405, dated July 30, 1878; application filed November 26, 1877.

*To all whom it may concern:*

Be it known that we, ABRAHAM F. RISSER and MICHAEL G. LANG, of Joliet, in the county of Will and State of Illinois, have invented a new and useful Improvement in Gig-Saddles, which is fully described in the following specification, reference being had to the accompanying drawings, in which—

Figure 1:
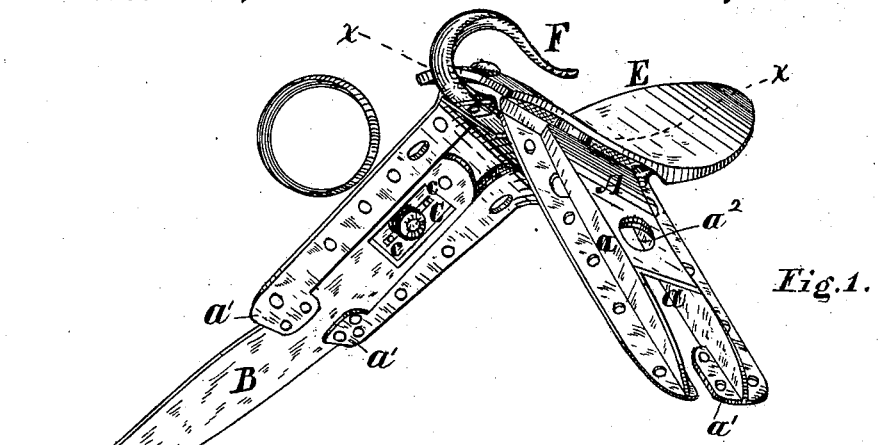
Figure 2:
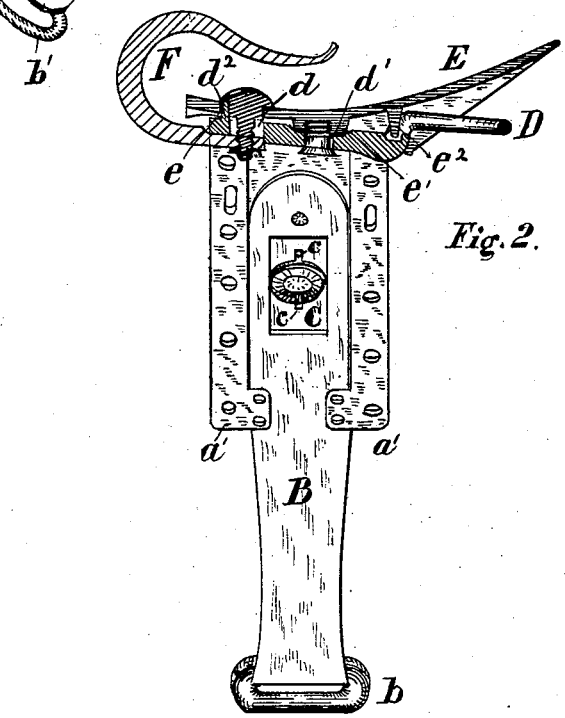

Figure 1 represents a perspective view of a gig-saddle containing our improvements; Fig. 2, a transverse section of the same, taken on the line $x\, x$, Fig. 1; and Fig. 3, a bottom view of the saddle-seat.

Our invention relates to gig-saddles in which the pad-plates of the tree are made in sections, instead of in one piece, and in which the loop-piece is detached from the rest of the tree.

The invention consists in the special construction of the skirt-iron, by means of which the loop-piece is secured and firmly held in position.

It also consists in the special construction of the seat and mode of attaching it to the tree.

In the drawings, A represents the tree, which is of the usual form. On each side, however, the plate is raised or bent so as to form a seat or housing, $a$, which is adapted to receive the upper end of the loop-iron B, which is made in a separate piece from the tree. The lower end of the tree or reach side is cut out for a little distance, as shown in Fig. 1 of the drawings, to facilitate the insertion of the loop-iron, and at the extreme lower end are short flanges or projections $a^1$, which extend inward flush with the lower surface of the tree. The housing is also provided with a single hole, $a^2$, for the reception of the terret-screw.

The loop-iron or piece B is constructed so that its upper end will enter and nicely fit the seat provided for it, as described above, in the side piece of the tree, and the lower end is provided with a loop, $b'$, to which the thill-strap is attached. In the upper end of the loop-iron a nut, C, is fitted, the body of the iron being cut away, so as to provide a seat for the nut in the under face of the iron. The nut is secured in the loop-iron in any suitable manner, one device which we have used being small cheap rivets, which are passed through holes in the nut and headed over narrow slots $c$ in the loop-iron. The nut C is adapted to receive the terret-screw, and when the loop-iron is in place in the tree the nut is intended to register with the hole $a^2$ in the tree. The loop-iron is secured to the tree by slipping it into the seat in the side of the latter, passing it over the lugs or projections $a^1$, as shown in Fig. 2 of the drawings. The terret is then passed through the hole $a^2$ and screwed into the nut C, thereby securely fastening the parts together, the loop-iron being held firmly between the housing and the lugs $a^1$. The loop D for the back-strap is made in one piece with the tree, and the latter is provided with two holes in its central portion, one, $d$, being arranged near the front edge, and the other, $d^1$, farther back, near the middle of the tree. A small lug or projection, $d^2$, extends upward at the front edge of the aperture $d$.

Figure 3:
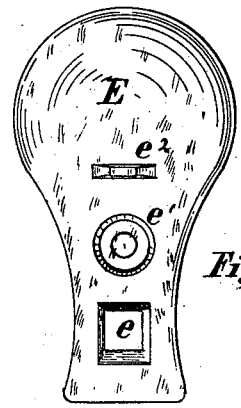

The seat E is constructed with a rectangular hole, $e$, near its front end, an enlargement or projection, $e^1$, on its lower surface, near the center thereof, and a small lug or projection, $e^2$, still farther to the rear, the three being arranged in line with each other, as shown in Fig. 3 of the drawings.

When the seat is placed in position on the tree, as shown in Fig. 2 of the drawings, the hole $e$ in the forward end is intended to register with the hole $d$ in the tree, and receive the projection $d^2$ on the latter. The lug or projection $e^2$ fits between the two branches of the back-strap loop D, which form a seat for it, and the enlargement or stud $e^1$ fits over the hole $d^1$ in the tree. The stud has a threaded hole cut into it to receive a screw inserted from the under side of the tree through the hole $d^1$, and a short bolt is passed down through the seat and tree by means of the front holes $d\, e$, and is fastened in place by means of a nut on its lower end, the check-hook F being first passed over it, so as to be secured in place by one and the same bolt.

The tree is finished up with leather in an ornamented style in the usual way, the loop-iron B being between the skirt-flap and the leather housing or covering upon the outside, to which it is secured only by means of the terret-screw passing down through it into the nut C. These loop-irons B are detached from the tree at any time by simply unscrewing the terret, when the loop-iron may be pulled out from beneath its leather covering. The leather portion of the saddle is also constructed so that it may be slipped off from the tree on each side of the latter after the terret has been unscrewed, this device and the loop-iron being the only means for holding it in place. It is evident, therefore, that the saddle is readily taken to pieces and put together, the loop-irons being removable, without disturbing the rest of the saddle, for the purpose of repairing the nut or any other part which may require attention.

When the several parts of the tree are fastened together, as described, they are held firmly in place, although readily detached, the pad being secured to the saddle in the usual way, so as to be detached.

With our improvements we are enabled, therefore, to construct a saddle cheap, easily put together, and taken apart at pleasure, and at the same time strong and durable.

Having thus described our invention, what we claim as new, and desire to secure by Letters Patent, is—

1. The saddle-tree A, constructed with a raised seat or housing, $a$, on each side, and provided with inwardly-projecting lugs or flanges $a^1$ at its lower ends, substantially as and for the purpose set forth.

2. The saddle-tree A, constructed with the seat $a$ on each side and rests or flanges $a^1$ at its lower ends, in combination with the independent and detachable loop-irons B, provided with nuts C, and the terret, whereby the loop-irons are secured to the tree, substantially as described.

3. The tree A, provided with the holes $d$ $d^1$ in its central portion, and a stud, $d^2$, in combination with the seat E, provided with a hole, $e$, and the projections $e^1$ $e^2$ on its lower side, all constructed and operating substantially as described.

ABRAHAM F. RISSER.
MICHAEL G. LANG.

Witnesses:
GALLUS MÜLLER,
E. W. WETMORE.